(12) United States Patent
Weh et al.

(10) Patent No.: US 11,767,000 B2
(45) Date of Patent: Sep. 26, 2023

(54) HYDRAULIC BLOCK FOR A HYDRAULIC POWER UNIT OF A HYDRAULIC POWER VEHICLE BRAKING SYSTEM

(71) Applicant: Robert Bosch GmbH, Stuttgart (DE)

(72) Inventors: Andreas Weh, Sulzberg (DE); Juergen Tandler, Fuessen (DE); Martin Hagspiel, Rettenberg (DE); Matthias Mayr, Rettenberg (DE); Stefan Kaserer, Ofterschwang (DE)

(73) Assignee: ROBERT BOSCH GMBH, Stuttgart (DE)

( * ) Notice: Subject to any disclaimer, the term of this patent is extended or adjusted under 35 U.S.C. 154(b) by 301 days.

(21) Appl. No.: 17/162,820

(22) Filed: Jan. 29, 2021

(65) Prior Publication Data

US 2021/0309197 A1    Oct. 7, 2021

(30) Foreign Application Priority Data

Apr. 7, 2020   (DE) .......................... 102020204459.7

(51) Int. Cl.
*B60T 8/36*   (2006.01)
*B60T 13/68*   (2006.01)

(52) U.S. Cl.
CPC ............ *B60T 8/368* (2013.01); *B60T 13/686* (2013.01); *B60Y 2400/301* (2013.01); *B60Y 2400/306* (2013.01); *B60Y 2400/81* (2013.01)

(58) Field of Classification Search
CPC ...... B60T 8/368; B60T 8/3685; B60T 13/686; B60T 13/745
See application file for complete search history.

(56) References Cited

U.S. PATENT DOCUMENTS

| | | | | |
|---|---|---|---|---|
| 4,796,958 A | * | 1/1989 | Brown, Jr. .............. | B60T 11/16 303/DIG. 10 |
| 9,566,964 B2 | * | 2/2017 | Jurgens ................. | B60T 8/4086 |
| 2013/0232965 A1 | * | 9/2013 | Ohnishi .................. | B60T 11/26 60/545 |
| 2014/0216866 A1 | * | 8/2014 | Feigel ..................... | B60T 17/00 188/156 |
| 2015/0166030 A1 | * | 6/2015 | Kobayashi .............. | B60T 13/58 303/14 |
| 2015/0298674 A1 | * | 10/2015 | Kratzer ................. | B60T 13/146 303/10 |
| 2015/0298675 A1 | * | 10/2015 | Mayr .................... | B60T 17/043 92/169.1 |
| 2016/0121864 A1 | * | 5/2016 | Misunou ................. | B60T 11/28 60/591 |
| 2017/0021813 A1 | * | 1/2017 | Tandler .................. | B60T 8/368 |

(Continued)

FOREIGN PATENT DOCUMENTS

| | | | | |
|---|---|---|---|---|
| DE | 102016202113 A1 | | 8/2017 | |
| DE | 102017218301 A1 | * | 4/2019 | |
| WO | WO-2021032331 A1 | * | 2/2021 | ............ B60T 13/148 |

*Primary Examiner* — Bradley T King
(74) *Attorney, Agent, or Firm* — NORTON ROSE FULBRIGHT US LLP; Gerard Messina

(57) ABSTRACT

A cuboidal hydraulic block of a hydraulic power unit of a hydraulic power vehicle braking system for use in a left-hand drive vehicle or a right-hand drive vehicle to be attachable, rotatably by 180° about a horizontal axis, at a splashboard of a motor vehicle. An electric motor of a power brake pressure generator is thus selectively situated on a right or a left side of the hydraulic block.

13 Claims, 5 Drawing Sheets

(56) References Cited

U.S. PATENT DOCUMENTS

| | | | |
|---|---|---|---|
| 2017/0274883 A1* | 9/2017 | Kim | B60T 13/686 |
| 2018/0056955 A1* | 3/2018 | Weh | F15B 13/0814 |
| 2018/0065609 A1* | 3/2018 | Leiber | B60T 8/368 |
| 2018/0170334 A1* | 6/2018 | Loeffler | B60T 8/404 |
| 2018/0312149 A1* | 11/2018 | Roberts | B60T 13/20 |
| 2019/0031164 A1* | 1/2019 | Tandler | B60T 8/368 |
| 2019/0100172 A1* | 4/2019 | Lee | B60T 13/745 |
| 2019/0100182 A1* | 4/2019 | Leiber | B60T 13/142 |
| 2019/0202425 A1* | 7/2019 | Feigel | B60T 8/4081 |
| 2019/0217837 A1* | 7/2019 | Feigel | B60T 13/686 |
| 2019/0299960 A1* | 10/2019 | Krajci | B60T 17/18 |
| 2020/0047731 A1* | 2/2020 | Reuter | B60T 13/146 |
| 2020/0062231 A1* | 2/2020 | Micke | B60T 13/745 |
| 2020/0172076 A1* | 6/2020 | Weh | B60T 8/17 |
| 2020/0216049 A1* | 7/2020 | Alili | B60T 11/26 |
| 2020/0391712 A1* | 12/2020 | Mallmann | B60T 11/22 |
| 2021/0122345 A1* | 4/2021 | Szymanski | B60T 11/26 |
| 2021/0155213 A1* | 5/2021 | Hoess | B60T 17/02 |
| 2021/0188232 A1* | 6/2021 | Mayr | B60T 13/686 |
| 2021/0354670 A1* | 11/2021 | Greiner | B60T 8/343 |
| 2021/0388829 A1* | 12/2021 | Weh | F04B 39/122 |
| 2022/0048484 A1* | 2/2022 | Taran | B60T 13/745 |
| 2022/0097667 A1* | 3/2022 | Roos | F15B 15/20 |
| 2022/0135014 A1* | 5/2022 | Briesewitz | B60T 8/4086 303/116.4 |
| 2022/0274578 A1* | 9/2022 | Weh | B60T 8/368 |
| 2022/0348176 A1* | 11/2022 | Weh | B60T 7/042 |

\* cited by examiner

HYDRAULIC BLOCK FOR A HYDRAULIC POWER UNIT OF A HYDRAULIC POWER VEHICLE BRAKING SYSTEM

CROSS REFERENCE

The present application claims the benefit under 35 U.S.C. § 119 of German Patent Application No. DE 102020204459.7 filed on Apr. 7, 2020, which is expressly incorporated herein by reference in its entirety.

FIELD

The present invention relates to a cuboidal hydraulic block for a hydraulic power unit of a hydraulic power vehicle braking system.

BACKGROUND INFORMATION

The German Patent Application No. DE 10 2016 202 113 A1 describes a narrow, cuboidal hydraulic block for a hydraulic power unit of a slip-controlled hydraulic power vehicle braking system, in which a master brake cylinder borehole is continuously placed from one to an opposing narrow side, and a power cylinder borehole is also placed continuously through two opposite large sides of the hydraulic block, perpendicular to the master brake cylinder borehole. An electric motor is situated at one of the two large sides of the hydraulic block coaxial to the power cylinder borehole. A box-shaped control unit cover, including an electronic control unit and solenoid coils for solenoid valves, is situated at the opposing other large side of the hydraulic block. The solenoid coils are situated in the interior of the control unit block in such a way that they enclose valve domes of the solenoid valves projecting from the hydraulic block. In addition, the hydraulic block has a blind hole for accommodating a pedal travel simulator, perpendicular to the master brake cylinder borehole and perpendicular to the power cylinder borehole, and blind holes for the connection to a brake fluid reservoir. Connections for brake lines which lead to hydraulic wheel brakes of the vehicle braking system are attached in the large side of the hydraulic block, at which the electric motor is situated.

SUMMARY

In accordance with an example embodiment of the present invention, a hydraulic block according to the present invention is provided for a hydraulic power unit of a hydraulic power vehicle braking system which, in particular, includes a slip controller. A main piece of hydraulic power vehicle braking systems which include a slip controller is a hydraulic power unit including a hydraulic block to which hydraulic wheel brakes of the vehicle braking system are connected by brake lines. Slip controllers are, in particular, an anti-lock braking unit, a traction control unit and/or vehicle dynamics control unit/electronic stability program, for which the abbreviations ABS, TCS and/or VDC/ESP are common. The latter are also colloquially referred to as "anti-skid control units." Slip controllers are conventional and are not discussed in greater detail here. The hydraulic power unit is used for a brake pressure generation via an external power and a brake pressure controller.

The hydraulic block is used to mechanically attach and hydraulically interconnect hydraulic components of the vehicle braking system or their slip controller. Such hydraulic components are, among other things, solenoid valves, check valves, hydraulic accumulators, damper chambers, pressure sensors and a power brake pressure generator, the power brake pressure generator usually including a piston-cylinder unit which is or will be accommodated in a power cylinder borehole of the hydraulic block. A piston of the piston-cylinder unit of the power brake pressure generator is often also referred to as a plunger piston, and the power cylinder borehole as a plunger receptacle, a plunger borehole, a plunger cylinder or the like. For a pressure generation via an external power, the piston of the power brake pressure generator is electromechanically displaced in the cylinder with the aid of an electric motor, which is or will be attached to the outside of the hydraulic block, using a threaded drive or a rotatory/translatory conversion gear in general, it being possible for a mechanical reduction gear, in particular a planetary gear, to be interconnected between the electric motor and the threaded drive or the conversion gear. The power cylinder borehole in the hydraulic block may form the cylinder of the power brake pressure generator, or a cylinder, a cylinder liner or the like may be situated at or in the power cylinder borehole. The power cylinder borehole may also be interpreted as a receptacle for the piston or the piston-cylinder unit of the power brake pressure generator.

The hydraulic components are attached in receptacles in the hydraulic block, which are usually designed as cylindrical through-holes or blind holes, partially with stepped diameters. "Interconnected" means that the receptacles or the hydraulic components attached therein are connected by lines in the hydraulic block corresponding to a hydraulic diagram of the vehicle braking system or its slip controller. The lines are typically drilled in the hydraulic block.

Equipped with the hydraulic components of the vehicle braking system or its slip controller, the hydraulic block forms a hydraulic power unit, "equipped" meaning that the hydraulic components are attached in the respective receptacles of the hydraulic block intended for them.

The hydraulic block according to an example embodiment of the present invention is cuboidal and preferably includes Cartesian boreholes; in particular, it is made up of metal. "Cartesian boreholes" means that the receptacles for the hydraulic components and the lines connecting them are attached in the hydraulic block in parallel and perpendicular to one another and to surfaces and edges of the hydraulic block. Individual oblique receptacles and/or lines are possible.

The hydraulic block according to the present invention includes a master brake cylinder borehole and a power cylinder borehole. The master brake cylinder borehole extends through from one to an opposing side of the hydraulic block and is open on one side, which is referred to as the attachment side here. Using the attachment side, the hydraulic block is, for example, attached in an engine compartment to a splashboard of a motor vehicle. On the opposing side, the master brake cylinder borehole is closed, or is sealed in a pressure-resistant manner with the aid of a plug, a cover or the like. The power cylinder borehole extends from a side abutting the attachment side to an opposing side, which also abuts the attachment side, through the hydraulic block.

The master brake cylinder borehole is provided for one or multiple master brake cylinder piston(s) of a master brake cylinder for a muscle power or auxiliary force actuation of the vehicle braking system, i.e., one of the master brake cylinder pistons is mechanically displaceable in the master brake cylinder borehole with the aid of a (foot) brake pedal or a (hand) brake lever. The piston(s) may be displaceably accommodated directly in the master brake cylinder borehole of the hydraulic block, or a cylinder, a cylinder liner or the like is situated on or in the power brake cylinder borehole, in which the piston(s) is/are displaceable. The hydraulic block or a portion of the hydraulic block surrounding the master brake cylinder borehole forms a master brake cylinder.

The power cylinder borehole is used to accommodate the piston of a power brake pressure generator, as was already explained above. The piston of the power brake pressure generator is often also referred to as a plunger piston. For a brake pressure generation via an external power, namely for an electromechanical brake pressure generation, the piston is displaceable in the power cylinder borehole with the aid of an electric motor via a threaded drive or using another rotatory/translatory conversion gear. A mechanical reduction gear may be provided between the electric motor and the threaded drive. The piston of the power brake pressure generator may be directly displaceable in the power cylinder borehole or is displaceable in a cylinder, a cylinder liner or the like, which is situated at or in the power cylinder borehole of the hydraulic block. An electric motor is or will be situated on the outside of the hydraulic block, on an opening of the power cylinder borehole and preferably coaxially to the power cylinder borehole. The side of the hydraulic block on which the electric motor is situated is referred to as the motor side here, and the opposite side is referred to as the control unit side. As mentioned, they both abut the attachment side.

An example embodiment of the present invention provides that, in a first installation and usage position, and in an installation and usage position which is rotated by 180° thereby about an axis which is in parallel to the master brake cylinder borehole, the hydraulic block may be attached to the splashboard or to another location of a motor vehicle and be used. The hydraulic block includes one or multiple connection(s) for a brake fluid reservoir in a side abutting the motor side, the control unit side and the attachment side, which is referred to as the reservoir side. A brake fluid reservoir is situatable on the reservoir side, which, for example, includes connection fittings at a bottom, which find their way into, for example, blind holes in the reservoir side of the hydraulic block when the brake fluid reservoir is situated on the reservoir side. The blind holes form the connections for the brake fluid reservoir. For the first installation and usage position, the connection or connections for the brake fluid reservoir is or are situated in an opposing side of the hydraulic block compared to the second installation and usage position of the hydraulic block, it also being possible for the hydraulic block to include the connection or connections in two opposing sides, the connections of one side being used for the first installation and usage position, and the connections in the opposing side being used for the second installation and usage position which is rotated with respect to the first installation and usage position by 180° about the axis which is in parallel to the master brake cylinder borehole. In one of the two installation and usage positions, the reservoir side of the hydraulic block according to the present invention is situated on the same side, and in the other installation and usage position it is situated on the other side, of the master brake cylinder borehole compared to the power cylinder borehole.

Due to the rotation of the hydraulic block by the 180° about the axis which is in parallel to the master brake cylinder borehole, the electric motor of the power brake pressure generator, in the installation and usage position, is selectively situated on the left or right of the hydraulic block. In this way, the installation of the hydraulic block into, for example, the engine compartment of a motor vehicle may be adapted to the spatial conditions, it also being possible to take into consideration displacements of an internal combustion or other drive engine, of a car battery and other power units situated in the engine compartment during an accident, so that the internal combustion or other drive engine, the car battery and the other power units, during an accident, preferably do not collide with the hydraulic block and the electric motor situated on the outside of the hydraulic block and, via the hydraulic block, deform the splashboard of the motor vehicle to which the hydraulic block is attached. For situating the electric motor on the left or right at the hydraulic block, it is not the electric motor that is selectively situated on the motor side or an opposing side of the hydraulic block, but the hydraulic block, together with the electric motor, is selectively situated on the motor side of the hydraulic block in one of the two installation and usage positions, which are rotated with respect to one another by 180° about the axis in parallel to the master brake cylinder borehole, in the engine compartment or in another location of the motor vehicle, resulting in the position of the electric motor on the left or right of the hydraulic block. "Left" and "right" refer to an installation position of the hydraulic block, for example, in the engine compartment of the motor vehicle. The two installation and usage positions of the hydraulic block according to the present invention are also used for an adaptation to left-hand drive vehicles and right-hand drive vehicles.

An example embodiment of the present invention is directed to the hydraulic block including the boreholes for the second installation and usage position which is rotated by 180° about the axis which is in parallel to the master brake cylinder borehole.

An example embodiment of the present invention is directed to the hydraulic block being selectively suitable for one of the two, or for both, installation and usage positions and being provided with the corresponding boreholes.

Refinements and advantageous embodiments of the present invention are described herein and shown in the figures.

The hydraulic block according to an example embodiment of the present invention preferably also includes a simulator borehole for a pedal travel simulator. The pedal travel simulator includes a simulator piston, which is, for example, displaceable in the simulator borehole counter to a spring force or gas pressure. The piston of the pedal travel simulator may be directly displaceable in the simulator borehole, or it is displaceable in a cylinder, a cylinder liner or the like, which is situated at or in the simulator borehole. The simulator borehole is connected to the master brake cylinder borehole, preferably via a solenoid valve, which may also be referred to as a simulator valve, and is used to accommodate brake fluid from the master brake cylinder, formed by the master brake cylinder borehole, when the master brake cylinder is hydraulically disconnected from the vehicle braking system during a power operation of the vehicle braking system by the closing of a separating valve, so that no brake fluid may be displaced from the master brake cylinder into the vehicle braking system. The pedal travel simulator enables a displacement of the piston in the master brake cylinder during a power actuation of the vehicle braking system, a force for the displacement of the piston usually increasing with increasing displacement travel. The simulator borehole is provided in the motor side of the hydraulic block according to the present invention, and on the same side of the master brake cylinder borehole as the power cylinder borehole, and on a side in the hydraulic block which faces away from the attachment side of the power cylinder borehole.

In one example embodiment of the present invention, a control unit housing is provided on the control unit side of the hydraulic block situated opposite the motor side, including an electronic control unit for controlling or regulating the solenoid valves and the electric motor for the brake pressure generation via external power and for the brake pressure and slip control. The control unit housing preferably includes solenoid coils for the solenoid valves of the brake pressure and slip controller, which enclose valve domes of the solenoid valves. The solenoid valves are situatable in the control unit side of the hydraulic block so that their valve domes project outwardly from the control unit side.

In one example embodiment of the present invention, the control unit housing includes a multi-pole electrical plug, coupling, plug board or the like, which here, in general, is referred to as an electrical plug connection for the electronic control unit for electrically connecting the electronic control unit to a car battery and for connecting the electronic control unit to sensors and the like. The electrical plug terminal is situated outside the control unit side on the side of the hydraulic block situated opposite the attachment side, where the plug terminal is easily accessible from above when the attachment side of the hydraulic block is attached at a splashboard.

All features described in the description herein and the figures may be implemented in specific embodiments of the present invention either alone or in a generally arbitrary combination. Embodiments of the present invention which do not include all, but only one or multiple features disclosed herein are generally possible.

BRIEF DESCRIPTION OF THE DRAWINGS

The present invention is described in greater detail hereafter based on one specific embodiment shown in the figures.

The figures are simplified and schematic illustrations to explain and provide an understanding of the present invention.

DETAILED DESCRIPTION OF EXAMPLE EMBODIMENTS

Figure 1:
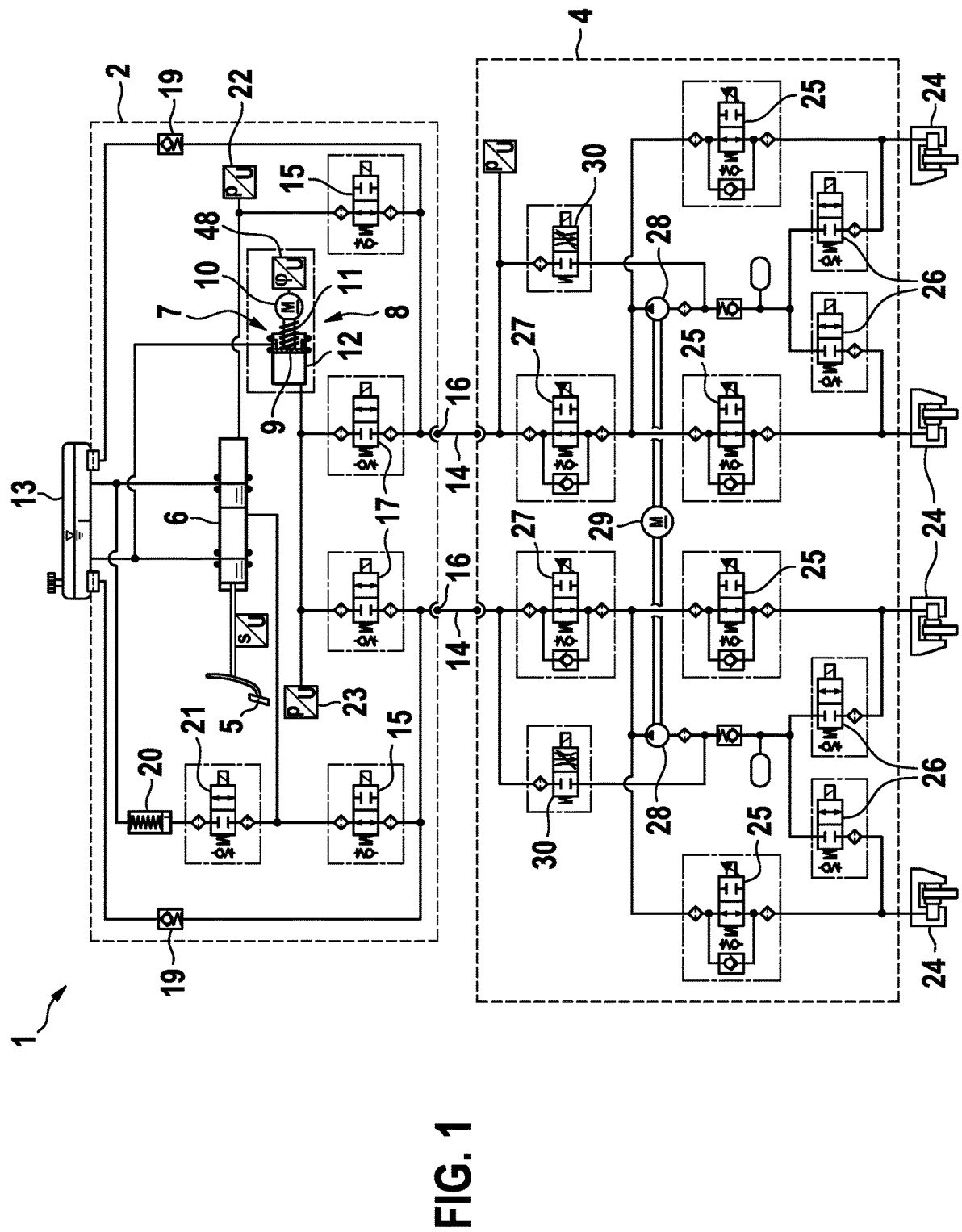
FIG. 1 shows a circuit diagram of a hydraulic power vehicle braking system, in accordance with an example embodiment of the present invention.
Figure 2:
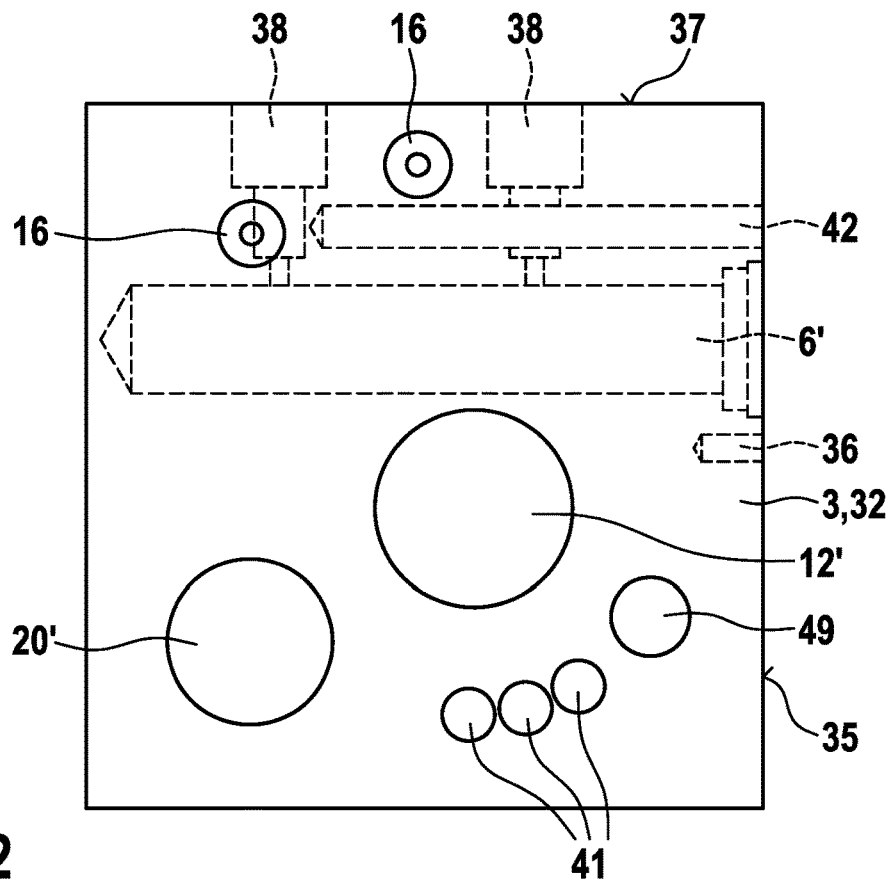
FIG. 2 shows a motor side of a hydraulic block according to an example embodiment of the present invention.
Figure 3:
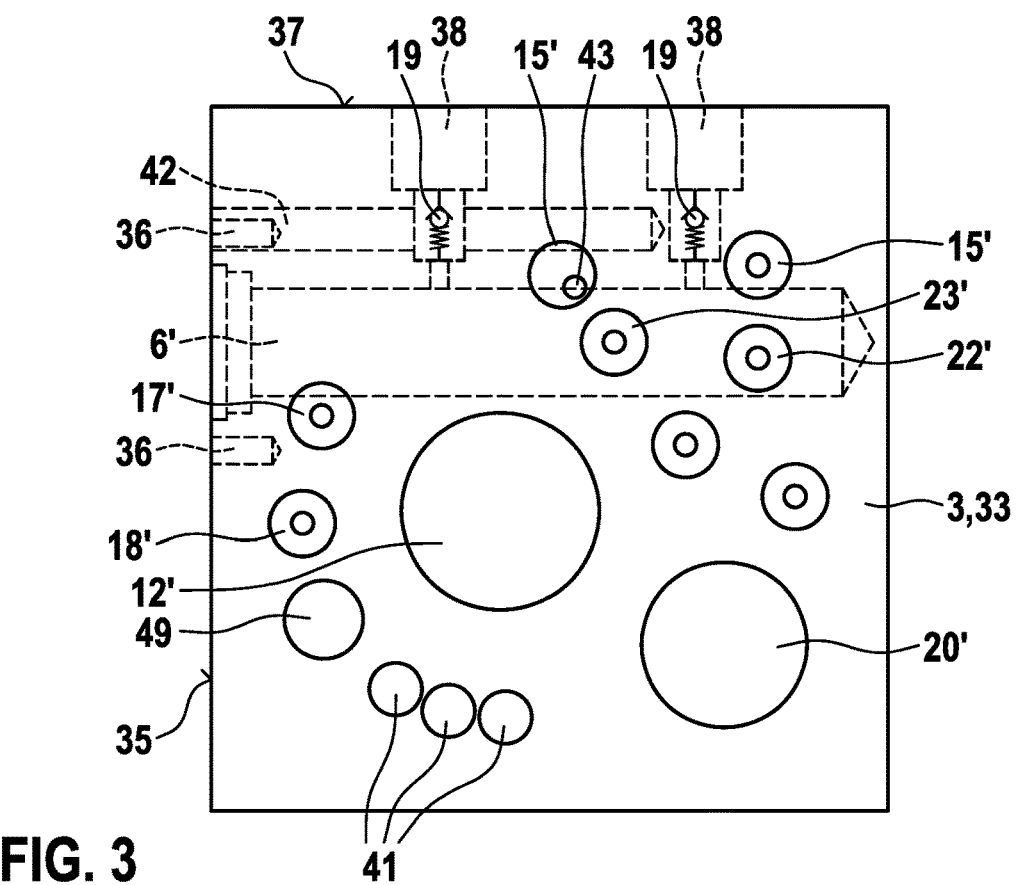
FIG. 3 shows a control unit side of the hydraulic block of FIG. 2 which is situated opposite the motor side.
Figure 4:
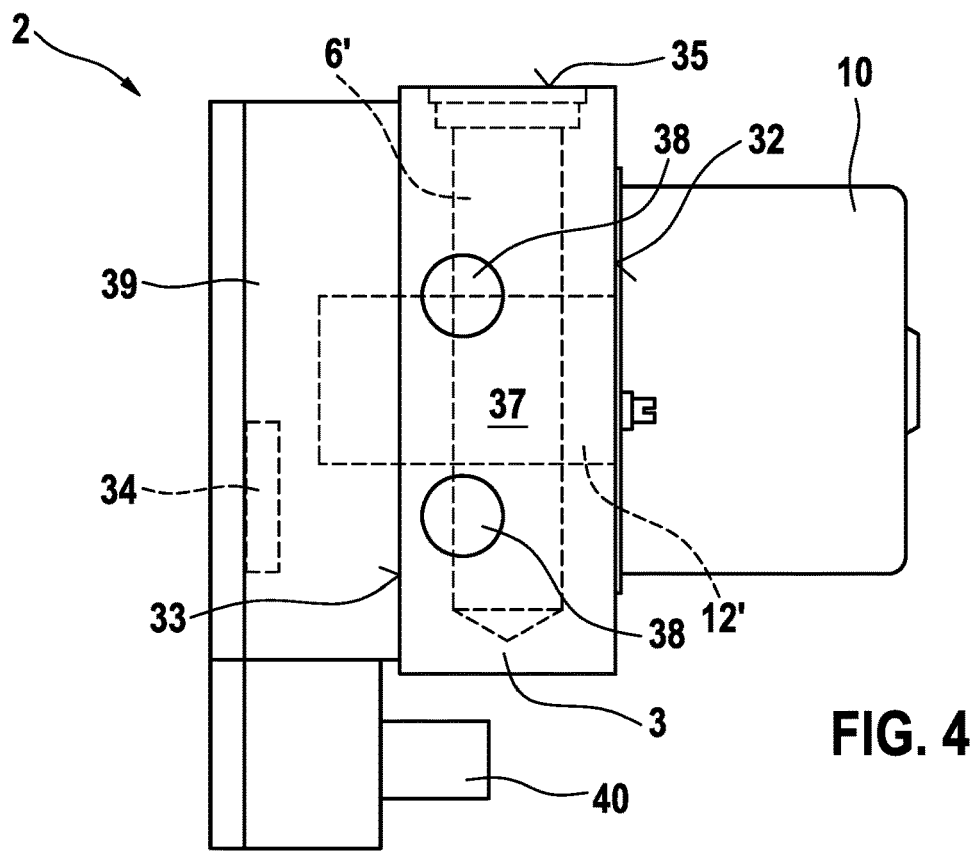
FIG. 4 shows a reservoir side of the hydraulic block of FIGS. 2 and 3.
Figure 5:
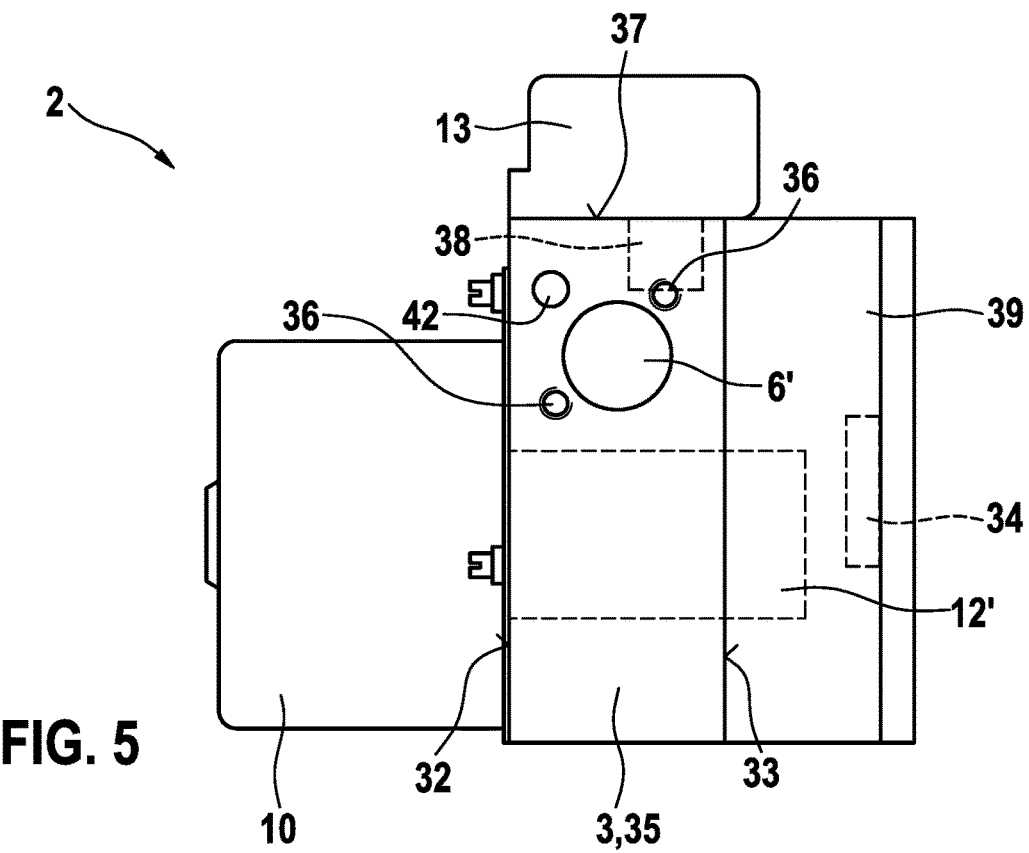
FIG. 5 shows an attachment side of the hydraulic block of FIGS. 2 through 4.

FIG. 1 shows a hydraulic dual-circuit power vehicle brake system 1 including a pressure generation module 2, which is accommodated in a first hydraulic block 3, and a pressure regulation module 4, which is accommodated in a second hydraulic block. FIGS. 2 and 3 show views of a motor side and a control unit side, situated opposite the motor side, of the first hydraulic block 3 according to the present invention, and FIGS. 4 and 5 show views of the motor side and of the control unit side of the first hydraulic block 3, including changed boreholes for an inverse installation of hydraulic block 3. The second hydraulic block is not shown.

Vehicle braking system 1 includes a dual-circuit master brake cylinder 6, actuatable with the aid of a foot brake pedal 5 by muscle power, and a power brake pressure generator 7 including a piston-cylinder unit 8, whose piston 9 is displaceable in a cylinder 12 of piston-cylinder unit 8 for generating a brake pressure with the aid of an electric motor 10 via a screw gear 11. Piston-cylinder unit 8 or overall power brake pressure generator 7 may also be referred to as a plunger unit, its piston 9 as a plunger piston, and its cylinder 12 as a plunger cylinder.

A brake fluid reservoir 13, to which the two chambers of master brake cylinder 6 are connected, is placed onto hydraulic block 3.

Pressure regulation module 4 is connected to pressure generation module 2 via one brake line 14 for each brake circuit. Each chamber of master brake cylinder 6 is connected by a separating valve 15 to terminals 16 of first hydraulic block 3, to which brake lines 14 for pressure regulation module 4 are connected.

Cylinder 12 of power brake pressure generator 7 is connected by power valves 17 to terminals 16 for pressure regulation module 4.

Brake fluid reservoir 13 is connected by check valves 19, through which a flow is possible in the direction from brake terminals 16 for pressure regulation module 4.

A pedal travel simulator 20 is connected to a first chamber of master brake cylinder 6 by a simulator valve 21. Pedal travel simulator 20 is a piston-cylinder unit including a piston acted upon by a spring, into which the brake fluid from master brake cylinder 6 is displaceable when simulator valve 21 is open, to be able to move foot brake pedal 5 when separating valves 15 are closed during a power actuation of vehicle braking system 1.

A pressure sensor 22 is connected to a second chamber of master brake cylinder 6, and a pressure sensor 23 is connected to cylinder 12 of power brake pressure generator 7. Electric motor of power brake pressure generator 7 includes a rotational position sensor 48 for measuring a rotational position or the number of revolutions of its rotor, which is a measure of a piston travel of piston 9 of piston-cylinder unit 8 of power brake pressure generator 7.

The components of vehicle braking system 1 described thus far are parts of pressure generation module 2 and are accommodated in the first hydraulic block 3. In FIGS. 2 through 9, the receptacles for the components are denoted by the reference numerals of their components, supplemented by a "'".

A service brake application takes place as a power brake application during which a brake pressure is generated by power brake pressure generator 7. For this purpose, power valves 17 are opened, and separating valves 15 are closed. Master brake cylinder 6 serves as a setpoint generator for the brake pressure to be generated. An auxiliary brake application in the event of a failure of power brake pressure generator 7 is possible with the aid of master brake cylinder 6.

An intake valve 25 and a discharge valve 26 for each wheel brake 24 are situated in the hydraulic block, which is not shown, of pressure regulation module 4. The components of vehicle braking system 1 described hereafter are accommodated in the second hydraulic block, which is not shown, of pressure regulation module 4. Wheel brakes 24 are connected via brake lines to the hydraulic block of pressure regulation module 4. In the shown exemplary embodiment, vehicle braking system 1 in each brake circuit includes two, i.e., a total of four, wheel brakes 24, and also four intake valves 25 and four discharge valves 26. In each brake circuit, intake valves 25 are connected via a connecting valve 27 and brake lines 14 to the respective terminal 16 of first hydraulic block 3 of pressure generation module 2.

Discharge valves 26 connect wheel brakes 24 to suction sides of hydraulic pumps 28, which may also be referred to as recirculating pumps. Vehicle braking system 1 in each brake circuit includes a hydraulic pump 28, which are jointly drivable by an electric motor 29. Pressure sides of hydraulic pumps 28 are connected between connecting valves 27 and intake valves 25.

Hydraulic pumps 28, intake valves 25, and discharge valves 26 form brake pressure regulating valve systems, with the aid of which wheel-specific slip controls such as anti-lock protection control, traction control and vehicle dynamics control/electronic stability program may be carried out. These slip controllers are usually abbreviated with ABS, TCS and VDC/ESP. Such slip controllers are known and are not discussed in greater detail here.

The suction sides of hydraulic pumps 28 are connected by second intake valves 30 to brake lines 14, which connect pressure regulation module 4 to the hydraulic block of pressure generation module 2.

In contrast to what is shown, vehicle braking system 1 may also only include one hydraulic block or be divided into three or more modules, which are accommodated in three or more hydraulic blocks (not shown). At least two power supply units, which are independent of one another, and at least two electronic control units, which are independent of one another, are present for controlling the valves and electric motors 10, 29 for a redundant operation of vehicle braking system 1. Separating valves 15, power valves 17, simulator valve 20, intake valves 25, discharge valves 26, connecting valves 27 and second intake valves 30 are 2/2-way solenoid valves, separating valves 15, intake valves 25 and connecting valves 27 being open in their de-energized basic positions, and power valves 17, simulator valve 20, discharge valves 26 and second intake valves being closed in their de-energized basic positions. The solenoid valves are or will be situated in receptacles for the counterbores of hydraulic blocks 3 forming the valves. Valve domes including armatures of the solenoid valves project from hydraulic blocks 3, solenoid coils for actuating the solenoid valves being placed onto them.

Figure 6:
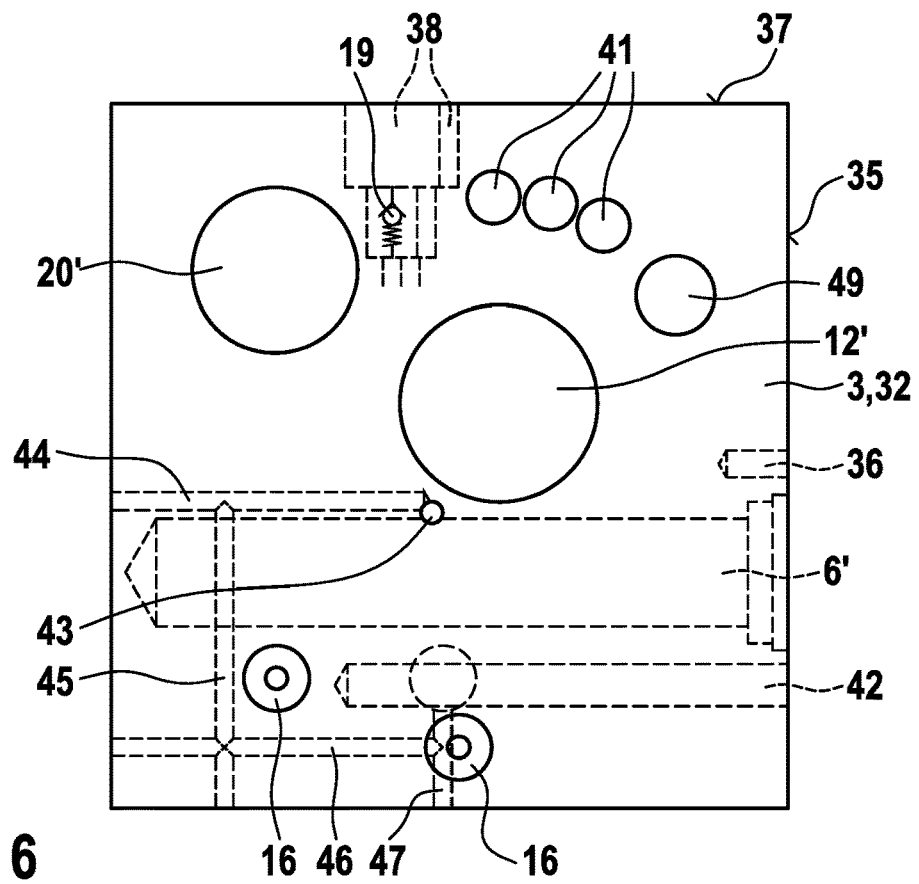
FIG. 6 shows the motor side of the hydraulic block of FIGS. 2 through 5, including modified boreholes in accordance with an example embodiment of the present invention.
Figure 7:
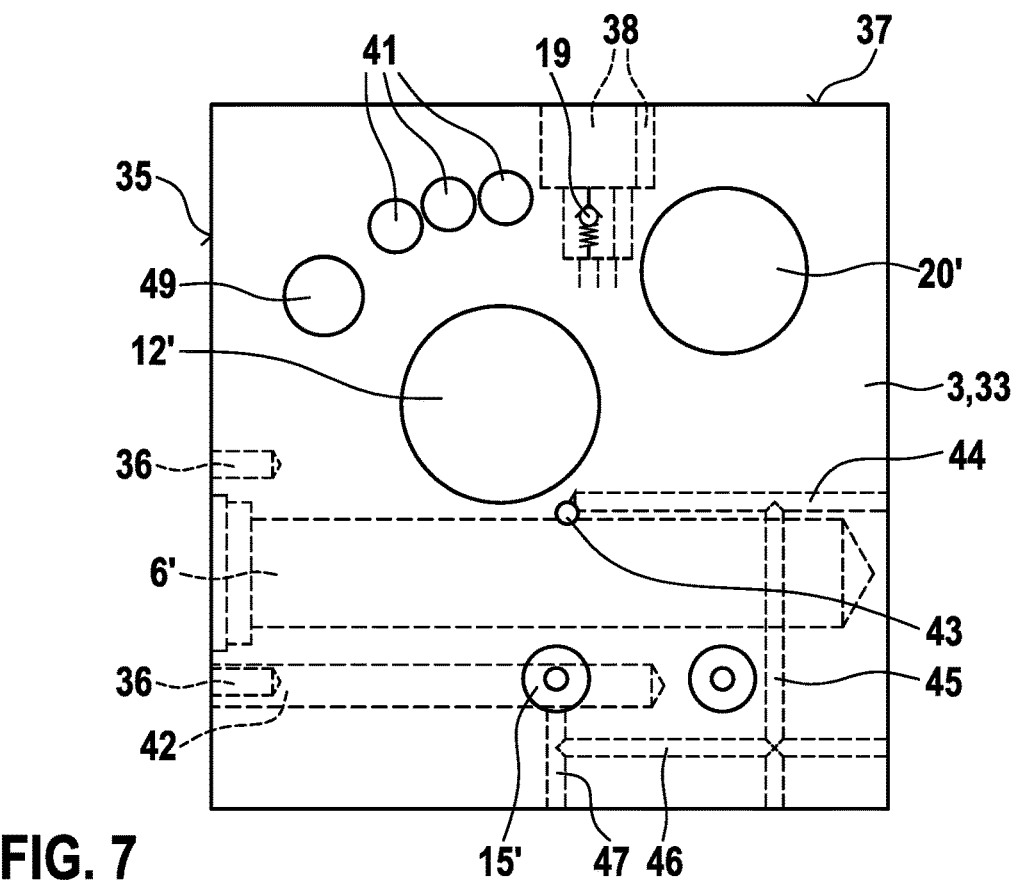
FIG. 7 shows a control unit side of the hydraulic block of FIG. 6.
Figure 8:
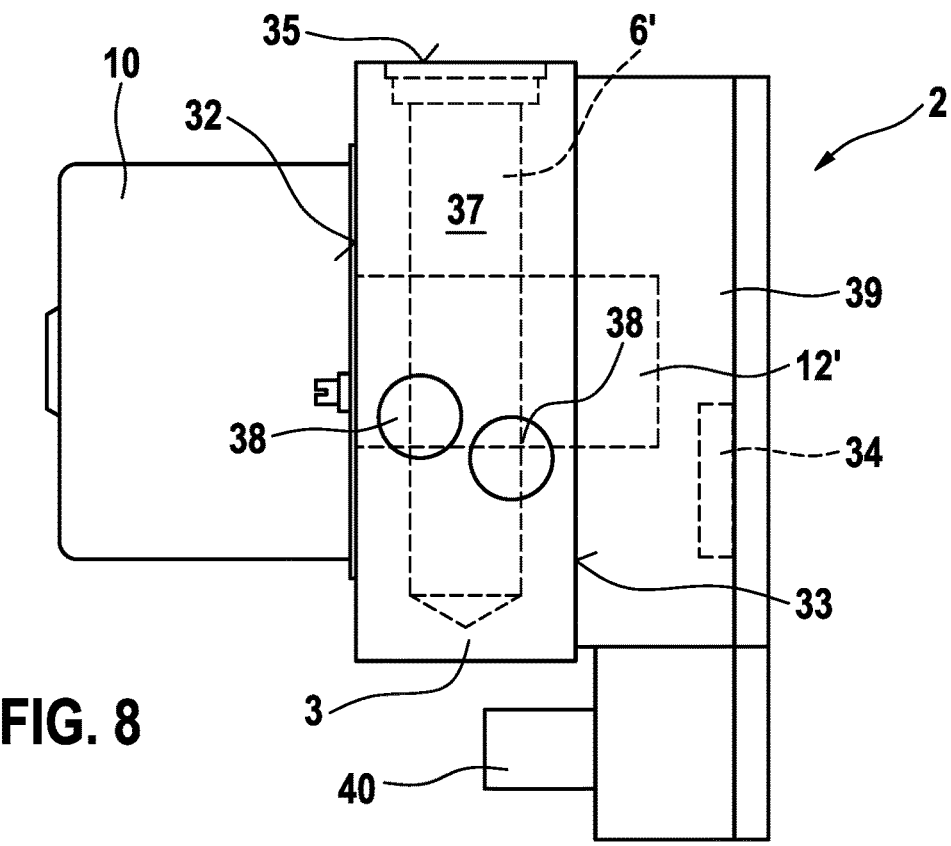
FIG. 8 shows a reservoir side of the hydraulic block of FIGS. 6 and 7.
Figure 9:
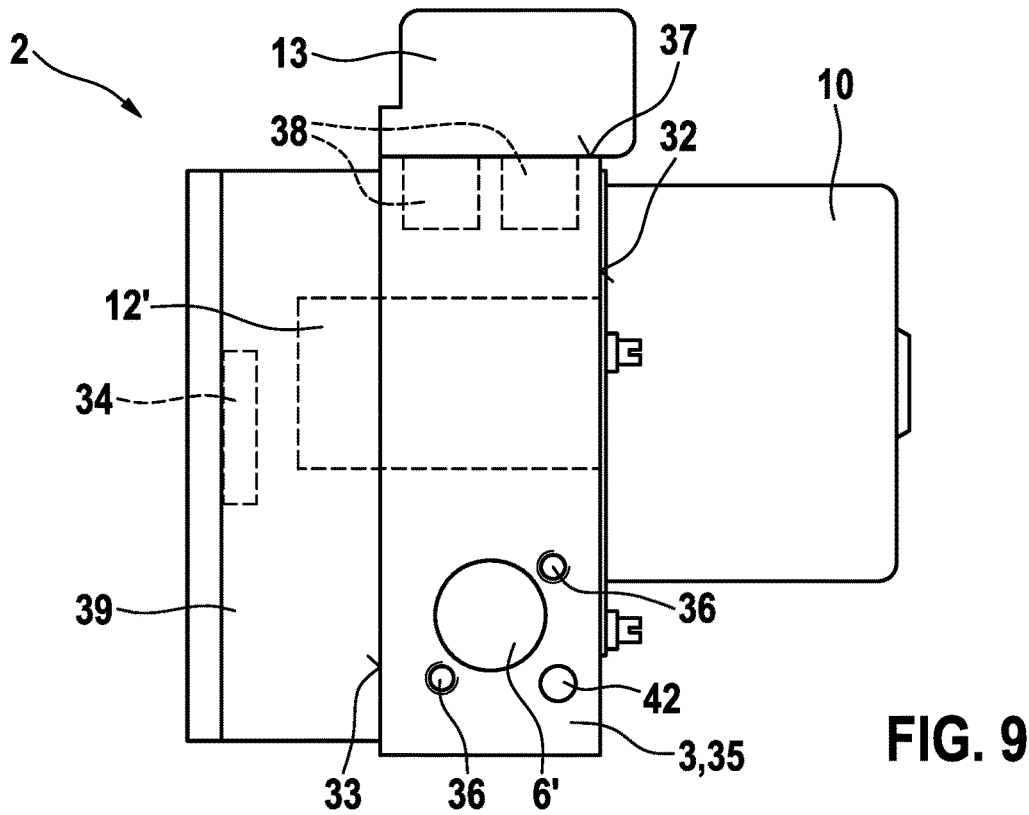
FIG. 9 shows an attachment side of the hydraulic block of FIGS. 6 through 8.

FIGS. 2 through 9 show the first hydraulic block 3 according to the present invention of pressure generation module 2 of the above-described hydraulic power vehicle braking system 1, FIGS. 2 and 6 showing a motor side 32, FIGS. 3 and 7 showing a control unit side 33 situated opposite motor side 32, FIGS. 4 and 8 showing a reservoir side 37, and FIGS. 5 and 9 showing an attachment side 36. FIGS. 6 through 9 show hydraulic block 3 including boreholes which are modified compared to FIGS. 2 through 5 for an inverse, so-to-speak "upside down" installation of hydraulic block 3. In general, this is hydraulic block 3 of vehicle braking system 1, which is attached at the splashboard of a motor vehicle and which includes master brake cylinder borehole 6' for master brake cylinder 6, whose master brake cylinder piston is displaced by foot brake pedal 5 via the pedal rod. In particular, brake fluid reservoir 13 is placed onto this hydraulic block 3, for which purpose it includes connections 38 in a side situated at the top in an installation and usage position, referred to as reservoir side 37 here. In addition to master brake cylinder borehole 6', hydraulic block 3 preferably also includes power cylinder borehole 12' of power brake pressure generator 7 and an electric motor 10 on a motor side 32 of hydraulic block 3.

In the exemplary embodiment, hydraulic block 3 is a narrow, cuboidal metal block, whose large sides opposite each other are almost square. "Narrow" means that a distance of the two large sides is not greater than half a length or width of the large sides. In the exemplary embodiment, the distance of the two large sides from one another is approximately one third to one quarter of the length or width of the large sides. Other ratios of the sides are possible. One of the two large sides is motor side 32, and the opposite large side is control unit side 33 of hydraulic block 3.

Hydraulic block 3 is used for mechanically attaching and hydraulically interconnecting the hydraulic components of the pressure generation unit, slip controller and brake pressure controller of the power vehicle brake system 1 described above based on FIG. 1. The hydraulic components are attached in receptacles in hydraulic block 3. The receptacles are cylindrical counterbores, blind holes and/or also through-holes, which may have stepped diameters and into which the hydraulic components are introduced and attached in a pressure-tight manner by, for example, a circumferential caulking. The hydraulic components may be recessed in the receptacles or protrude from hydraulic block 3. Equipped with the hydraulic components, electric motor 10 of power brake pressure generator 7 and an electronic control unit 34, hydraulic block 3 forms the hydraulic power unit for the power brake pressure generation and brake pressure control of power vehicle braking system 1.

Hydraulic interconnection means that the receptacles for the hydraulic components are connected to one another by lines leading through hydraulic block 3, corresponding to the hydraulic diagram shown in FIG. 1 of power vehicle braking system 1 or its slip controller. The receptacles and lines form so-called "boreholes" of hydraulic block 3, it being generally also possible for the receptacles and lines to be created in a manner other than drilling. Hydraulic block 3 according to the present invention has Cartesian boreholes, which means that the receptacles for the hydraulic components and the lines connecting them extend in parallel and perpendicularly to one another and to sides and edges of the cuboidal hydraulic block 3. Individual receptacles and/or lines may also be applied obliquely in the hydraulic block 3. Hydraulic block 3 may include receptacles for all components of vehicle braking system 1 shown in FIG. 1, or only receptacles for a portion of the components are present, and receptacles for another portion of the components are provided in one or multiple further hydraulic block(s), not shown, which are connected by brake lines to the shown hydraulic block 3. In the shown and described specific embodiment, vehicle braking system 1 includes two hydraulic blocks, of which FIGS. 2 through 9 show one, namely the first, hydraulic block 3 of pressure generation module 2.

Hydraulic block 3 includes a master brake cylinder borehole 6', which forms master brake cylinder 6. Master brake cylinder borehole 6' extends in parallel to motor side 32 and to control unit side 33, in a center between motor side 32 and control unit side 33, from one to an opposite narrow side of hydraulic block 3, through hydraulic block 3. Master brake cylinder borehole 6' may be closed at one end or be sealed in a pressure-tight manner, for example, with the aid of a plug or a cover. At the other end, master brake cylinder borehole 6' is open for a pedal rod, which connects foot brake pedal 5 to a first master brake cylinder piston in an articulated manner. The first master brake cylinder piston may also be referred to as a primary piston or as a rod piston. A narrow side of hydraulic block 3, at which master brake cylinder borehole 6' is open for the pedal rod, forms an attachment side 35 of hydraulic block 3. It is provided to attach hydraulic block 3 to a splashboard of a motor vehicle, which is not shown, with attachment side 35 in an engine compartment. For the attachment, hydraulic block 3 includes internal thread holes as attachment holes 36 in parallel to master brake cylinder borehole 6', which in the exemplary embodiment are provided at the same radial distance from master brake cylinder borehole 6' diametrically opposed to one another and, in the exemplary embodiment, diagonally opposed to one another, in attachment side 35 of hydraulic block 3. The attachment of hydraulic block 3 may also take place in another manner.

Master brake cylinder borehole 6' is used for displaceably accommodating the first master brake cylinder piston and, in the exemplary embodiment, a further master brake cylinder piston, which may also be referred to as a secondary piston or floating piston. The master brake cylinder pistons may be axially displaceably guided directly in master brake cylinder borehole 6' or indirectly in, for example, a cylinder liner situated in master brake cylinder borehole 6'.

Hydraulic block 3 according to the present invention includes a power cylinder borehole 12' which extends perpendicularly from motor side 32 to the opposite control unit side 33, past master brake cylinder borehole 6', through hydraulic block 3. Power cylinder borehole 12' forms cylinder 12 of piston-cylinder unit 8 of power brake pressure generator 7 and is used to displaceably accommodate piston 9 of power brake pressure generator 7, which is often also referred to as a plunger piston.

Piston 9 of power brake pressure generator 7 may be axially displaceably guided directly in power cylinder borehole 12', or indirectly in a cylinder liner or a cylinder, which is situated in power cylinder borehole 12'.

For driving, i.e., for displacing piston 9 in power cylinder borehole 12', electric motor 10 is or will be attached coaxially to power cylinder borehole 12' on the outside of motor side 32 of hydraulic block 3. Electric motor 10 displaces piston 9 via a planetary gear, which is not visible in the drawing, as a reduction gear, and a recirculating ball gear, which is also not visible, as a threaded drive. Electric motor 10, the reduction gear, the threaded drive, piston 9 and cylinder 12 or power cylinder borehole 12' form power brake pressure generator 7 for generating a hydraulic brake pressure for a power brake application.

Master brake cylinder borehole 6' and power cylinder borehole 12' are cylindrical through-holes having stepped diameters and circumferential grooves.

In motor side 32, hydraulic block 3 includes a receptacle 20' for pedal travel simulator 20. Receptacle 20' for pedal travel simulator 20 is a cylindrical counterbore or a cylindrical blind hole, perpendicular in motor side 32 of hydraulic block 3. Receptacle 20' for pedal travel simulator 20 is thus applied in parallel to power cylinder borehole 12' and perpendicular to master brake cylinder borehole 6' in hydraulic block 3.

In a narrow side abutting attachment side 35, which is referred to as reservoir side 37 here, hydraulic block 3 according to the present invention includes blind holes as connections 38 for brake fluid reservoir 13 which is situated on reservoir side 37 of hydraulic block 3. At its bottom, brake fluid reservoir 13 includes connection fittings, which find their way into connections 38, when brake fluid reservoir 13 is placed onto attachment side 37 of hydraulic block 3, and are sealed with O-rings there, so that the two chambers of brake fluid reservoir 13 communicate with the two chambers of master brake cylinder 6 and with check valves 19.

In FIGS. 2 through 5, connections 38 for brake fluid reservoir 13 are situated offset in a longitudinal direction in reservoir side 37. From a center between reservoir side 37 and a narrow side of hydraulic block 3 situated opposite reservoir side 37, master brake cylinder borehole 6' is situated offset in hydraulic block 3 by approximately one half of a diameter of master brake cylinder borehole 6' in the direction toward reservoir side 37. Power cylinder borehole 12' and receptacle 20' for pedal travel simulator 20 are situated on a side of master brake cylinder borehole 6' which faces away from reservoir side 37, power cylinder borehole 12' being situated close to master brake cylinder borehole 6', and approximately in a center between attachment side 35 and the side of hydraulic block 3 situated opposite attachment side 35. Receptacle 20' for pedal travel simulator 20 is situated approximately in a center between power cylinder borehole 12' and the side of hydraulic block 3 situated opposite attachment side 35 and has a larger distance from master brake cylinder borehole 6' than power cylinder borehole 12'.

In FIGS. 6 through 9, hydraulic block 3 is provided for an attachment in an installation and usage position which is rotated by 180° in relation to master brake cylinder borehole 6' compared to FIGS. 2 through 5. It is attached unchanged with its attachment side 35 to, for example, a splashboard of a motor vehicle, however, as described, rotated by 180° about the axis which is in parallel to master brake cylinder borehole 6'. For this purpose, connections 38 for brake fluid reservoir 13 are not attached on the side of master brake cylinder borehole 6' which is situated opposite power cylinder borehole 12', but in the narrow side of hydraulic block 3, on the same side of master brake cylinder borehole 6' as power cylinder borehole 12'. In FIGS. 2 through 5 on the one hand, and FIGS. 6 through 9 on the other hand, connections 38 for brake fluid reservoir 13 are thus attached in opposite sides of hydraulic block 3. Hydraulic block 3 is always situated with the side which includes connections 38 for brake fluid reservoir 13 facing up, and brake fluid reservoir 13 is situated on this side of hydraulic block 3. It is always the side that includes connections 38 for brake fluid reservoir 13 that is referred to as reservoir side 37 of hydraulic block 3.

Hydraulic block 3 is provided for a left-hand drive vehicle in the embodiment of FIGS. 2 through 5, and for a right-hand drive vehicle in the embodiment of FIGS. 6 through 9. Electric motor 10, as viewed in a driving direction, is situated on a right side of hydraulic block 3 in FIGS. 2 through 5, and on a left side of hydraulic block 3 in FIGS. 6 through 9, when hydraulic block 3 is attached in a motor vehicle with reservoir side 37 at the top, and with attachment side 35 at the rear in the driving direction, i.e., hydraulic block 3 is attached on a side facing away from a passenger compartment to a splashboard in an engine compartment.

In contrast to FIGS. 2 through 5, connections 38 for brake fluid reservoir 13 in FIGS. 6 through 9 are almost not offset from one another in the longitudinal direction, but are situated with an offset of less than half their diameter next to one another in reservoir side 37 of hydraulic block 3. In FIGS. 6 through 9, connections 38 for brake fluid reservoir 13 are situated close to a center between attachment side 35 and the side of hydraulic block 3 situated opposite attachment side 35, so that connections 38, as is also the case in FIGS. 2 through 5, have a distance of at least one quarter or one third of a distance of attachment side 35 from the opposite side, so that they are easily accessible when hydraulic block 3 is attached to a splashboard or to another location in a motor vehicle.

In control unit side 33, hydraulic block 3 includes blind holes, which may have stepped diameters, as receptacles for the solenoid valves of pressure generation module 2 of power vehicle braking system 1. In FIGS. 2 through 9, the receptacles for the solenoid valves are denoted by the reference numerals of the solenoid valves, supplemented by a "'". Check valves 19 are situated in counterbores at the base of connections 38 for brake fluid reservoir 13.

A square or rectangular, box-shaped control unit housing 39, whose open side faces hydraulic block 3, is situated on control unit side 33 of hydraulic block 3. Control unit housing 39 covers valve domes of the solenoid valves, which project from hydraulic block 3 on control unit side 33. Control unit 34 is accommodated in a bottom or a ceiling of control unit housing 39.

Control unit housing 39 protrudes beyond hydraulic block 3 on the side of hydraulic block 3 which is situated opposite attachment side 35, and includes a plug board as electrical plug connection 40 there. Plug connection 40 is thus easily accessible from above when hydraulic block 3, with its attachment side 35, is attached to, for example, a splashboard in an engine compartment of a motor vehicle, which is not shown.

For a connection of electric motor 10 to electrical plug connection 40 and to control unit 34, three through-holes 41 are applied in hydraulic block 3 in a circumferential section of less than 90° outside a circumference of power cylinder borehole 12' around power cylinder borehole 12', through which electrical connecting lines for electric motor 10 are guided to plug connection 40 and a through-hole 49, through which the signal and control lines are passed for electric motor 10 and from rotational position sensor 48 to electronic control unit 34.

In parallel to and close to master brake cylinder borehole 6', hydraulic block 3 includes a signal transmitter borehole 42 for a signal transmitter of a master brake cylinder piston. The signal transmitter is, for example, a permanent magnet, which is attached to a rod-shaped holder, which outside hydraulic block 3 is connected to the pedal rod connecting foot brake pedal 5 to first master brake cylinder piston in an articulated manner, so that the signal transmitter moves along with master brake cylinder piston (not shown). Signal transmitter borehole 42 is open on attachment side 35 of hydraulic block 3. Using a sensor which is not shown, for example a Hall sensor, which is situated in a sensor borehole in hydraulic block 3, the position of the signal transmitter, and thus the position of the master brake cylinder piston in master brake cylinder borehole 6', is measurable.

For a ventilation of master brake cylinder borehole 6', hydraulic block 3 includes a first vent hole 43, which tangentially intersects master brake cylinder borehole 6' on a side facing attachment side 35. In FIGS. 2 and 3, first vent hole 43 opens into a receptacle 15' for a separating valve 15 in control unit side 33. In FIGS. 6 and 7, first vent hole 43 opens into a second vent hole 44, which leads in parallel to master brake cylinder borehole 6' to the side of hydraulic block 3 which is situated opposite attachment side 35, from which a third vent hole 45 leads to the side of hydraulic block 3 which is situated opposite reservoir side 37, from which a fourth vent hole 46 leads back again in the direction of attachment side 35, from which a fifth vent line 47 leads in the direction of reservoir side 37 and into receptacle 15' for the one separating valve 15. Both in FIGS. 2 and 3 and in FIGS. 6 and 7, first vent hole 43 intersects master brake cylinder borehole 6' on the side facing reservoir side 37. If hydraulic block 3, as intended, is attached with reservoir side 37 at the top, first vent hole 43 intersects master brake cylinder borehole 6' at the top, i.e., where potential gas bubbles accumulate in the brake fluid. In this way, hydraulic block 3, when it is installed and thus filled with brake fluid, may be vented.

Blind holes as terminals 16 for brake lines 14 are applied in motor side 32 of hydraulic block 3. Terminals 16 may include internal threads for connecting brake lines to screw-type fittings or may be threadless for connecting brake lines to fittings using caulking, in particular using self-clinch fittings, which caulk themselves in a pressure-tight manner when pressed into the blind holes. With the aid of brake lines 14, another not shown hydraulic block, which includes a portion of the hydraulic components of power vehicle braking system 1, or wheel brakes, are connectable to hydraulic block 3. For example, the not shown hydraulic block of pressure regulation module 4 of vehicle braking system 1 is connectable to terminals 16 of hydraulic block 3 of pressure generation module 2 by brake lines 14.

What is claimed is:

1. A cuboidal hydraulic block for a hydraulic power unit of a hydraulic power vehicle braking system, which is provided for an attachment, with an attachment side, to a splashboard of a motor vehicle, the hydraulic block comprising:
    a motor side;
    a control unit side situated opposite the motor side, the attachment side abutting the motor side and the control unit side;
    a reservoir side which abuts the motor side, the control unit side, and the attachment side, and on which a brake fluid reservoir is situatable;
    a master brake cylinder borehole which is open on the attachment side of the hydraulic block;
    a power cylinder borehole which extends from the motor side to the control unit side through the hydraulic block;
    a signal transmitter borehole configured to receive a position transmitter of a master cylinder piston, the signal transmitter borehole being open on the attachment side of the hydraulic block and extending parallel of the master cylinder borehole, the signal transmitter borehole being on an opposite side of the master brake cylinder borehole than power cylinder borehole;
    a cylindrical receptacle open on the motor side and configured to receive a pedal travel simulator extending from the motor side toward the control side through the hydraulic block, the cylindrical receptacle being situated on the same side of the master brake cylinder borehole as the power cylinder borehole, and on a side of the power cylinder borehole which faces away from the attachment side;
    a plurality of through-holes extending from the motor side to the control unit side through the hydraulic block configured to receive electrical connecting lines electrically connecting an electrical motor on the motor side to an electronic control unit on the control unit side, the plurality of through-holes being situated on a side of the power cylinder borehole opposite to a side on the power cylinder borehole on which the master brake cylinder is situated and being situated closer to the attachment side than the cylindrical receptacle; and wherein the hydraulic block, including the master brake cylinder borehole, the power cylinder borehole, the signal transmitter borehole, the cylindrical receptacle, and the plurality of through-holes, has two installation and usage positions which are rotated with respect to one another by 180° about an axis which is in parallel to the master brake cylinder borehole, and the reservoir side is situated on a side of the master brake cylinder borehole which is situated opposite the power cylinder borehole for one of the two installation and usage positions, and is situated on the same side of the master brake cylinder borehole as the power cylinder borehole for the other installation and usage position.

2. The hydraulic block as recited in claim 1, wherein the hydraulic block includes a connection for the brake fluid reservoir on the reservoir side on the same side of the master brake cylinder borehole as the power cylinder borehole.

3. The hydraulic block as recited in claim 1, wherein the connection for the brake fluid reservoir has at least a distance of one quarter or one third of a length of the reservoir side from the attachment side.

4. The hydraulic block as recited in claim 1, wherein, as viewed looking at the reservoir side, the connection for the brake fluid reservoir is situated between the cylindrical receptacle for the pedal travel simulator and the plurality of through-holes.

5. The hydraulic block as recited in claim 1, wherein the hydraulic block includes a first vent hole for the master brake cylinder borehole, which tangentially intersects the master brake cylinder borehole on a side facing the reservoir side.

6. The hydraulic block as recited in claim 5, wherein a second vent hole leads from the first vent hole in a direction of a side of the hydraulic block which is situated opposite the attachment side, a third vent hole leads from the second vent hole in a direction of a side of the hydraulic block which is situated opposite the reservoir side, and a fourth vent hole leads from the third vent hole in a direction of the attachment side of the hydraulic block.

7. The hydraulic block as recited in claim 1, wherein an electronic control unit, which includes an electrical plug connection on a side of the hydraulic block which is situated opposite the attachment side, is situated on the control unit side of the hydraulic block.

8. The hydraulic block as recited in claim 7, wherein the electronic control unit is situated at the control unit side, and an electric motor of a power brake pressure generator is situated at the opposite motor side of the hydraulic block, and the electronic control unit and the electric motor are situated in a fixed position with respect to one another and to the power cylinder borehole at the hydraulic block.

9. A cuboidal hydraulic block for a hydraulic power unit of a hydraulic power vehicle braking system, which is provided for an attachment, with an attachment side, to a splashboard of a motor vehicle, the hydraulic block comprising:

a motor side;
a control unit side situated opposite the motor side, the attachment side abutting the motor side and the control unit side; and
a reservoir side which abuts the motor side, the control unit side, and the attachment side, and on which a brake fluid reservoir is situatable;
a master brake cylinder borehole which is open on the attachment side of the hydraulic block;
a power cylinder borehole which extends from the motor side to the control unit side through the hydraulic block; and
a connection for the brake fluid reservoir on the reservoir side;
wherein the hydraulic block includes a first vent hole for the master brake cylinder borehole, which tangentially intersects the master brake cylinder borehole on a side facing the reservoir side;
wherein a second vent hole leads from the first vent hole in a direction of a side of the hydraulic block which is situated opposite the attachment side, a third vent hole leads from the second vent hole in a direction of a side of the hydraulic block which is situated opposite the reservoir side, and a fourth vent hole leads from the third vent hole in a direction of the attachment side of the hydraulic block.

10. The hydraulic block as recited in claim 9, wherein the hydraulic block includes a receptacle for a pedal travel simulator in the motor side on the same side of the master brake cylinder borehole as the power cylinder borehole, and on a side of the power cylinder borehole which faces away from the attachment side.

11. The hydraulic block as recited in claim 9, wherein the hydraulic block includes a signal transmitter borehole, which is in parallel to the master brake cylinder borehole and open on the attachment side, for a rod-shaped holder of a position transmitter of a master brake cylinder piston.

12. A cuboidal hydraulic block for a hydraulic power unit of a hydraulic power vehicle braking system, which is provided for an attachment, with an attachment side, to a splashboard of a motor vehicle, the hydraulic block comprising:

a motor side;
a control unit side situated opposite the motor side, the attachment side abutting the motor side and the control unit side;
a reservoir side which abuts the motor side, the control unit side and the attachment side, and on which a brake fluid reservoir is situatable;
a master brake cylinder borehole, which is open at the attachment side of the hydraulic block;
a power cylinder borehole, which extends from the motor side to the control unit side through the hydraulic block; and
a connection for the brake fluid reservoir at the reservoir side;
where the reservoir side is situated on the same side of the master brake cylinder borehole as the power cylinder boreholes;
wherein the hydraulic block includes a first vent hole for the master brake cylinder borehole, which tangentially intersects the master brake cylinder borehole on a side facing the reservoir side;
wherein a second vent hole leads from the first vent hole in a direction of a side of the hydraulic block which is situated opposite the attachment side, a third vent hole leads from the second vent hole in a direction of a side of the hydraulic block which is situated opposite the reservoir side, and a fourth vent hole leads from the third vent hole in a direction of the attachment side of the hydraulic block.

13. A cuboidal hydraulic block for a hydraulic power unit of a hydraulic power vehicle braking system, which is provided for an attachment, with an attachment side, to a splashboard of a motor vehicle, the hydraulic block comprising:

a motor side;
a control unit side situated opposite the motor side, the attachment side abutting the motor side and the control unit side;
a reservoir side which abuts the motor side, the control unit side and the attachment side, and on which a brake fluid reservoir is situatable;
a master brake cylinder borehole, which is open at the attachment side of the hydraulic block;
a power cylinder borehole, which extends from the motor side to the control unit side through the hydraulic block;
a signal transmitter borehole configured to receive a position transmitter of a master cylinder piston, the signal transmitter borehole being open on the attachment side of the hydraulic block and extending parallel of the master cylinder borehole, the signal transmitter borehole being on an opposite side of the master brake cylinder borehole than power cylinder borehole;
a cylindrical receptacle open on the motor side and configured to receive a pedal travel simulator extending from the motor side toward the control side through the hydraulic block, the cylindrical receptacle being situated on the same side of the master brake cylinder borehole as the power cylinder borehole, and on a side of the power cylinder borehole which faces away from the attachment side;
a plurality of through-holes extending from the motor side to the control unit side through the hydraulic block configured to receive electrical connecting lines electrically connecting an electrical motor on the motor side to an electronic control unit on the control unit side, the plurality of through-holes being situated on a side of the power cylinder borehole opposite to a side on the power cylinder borehole on which the master brake cylinder is situated and being situated closer to the attachment side than the cylindrical receptacle; and
wherein the hydraulic block, including the master brake cylinder borehole, the power cylinder borehole, the signal transmitter borehole, the cylindrical receptacle, and the plurality of through-holes, is configured so that, for a first installation and usage position of the hydraulic block, a side of the hydraulic block which is situated opposite the power cylinder borehole with respect to the master brake cylinder borehole is provided as the reservoir side, and, for a second installation and usage position of the hydraulic block which is rotated by 180°, with respect to the first installation and usage position, about an axis which is in parallel to the master brake cylinder borehole, a side of the hydraulic block which is situated on the same side of the master brake cylinder borehole as the power cylinder borehole is provided as the reservoir side.

\* \* \* \* \*